(12) United States Patent
Nishiyama

(10) Patent No.: US 12,155,325 B2
(45) Date of Patent: Nov. 26, 2024

(54) MOTOR CONTROL UNIT AND MOTOR DEVICE

(71) Applicant: Rohm Co., Ltd., Kyoto (JP)

(72) Inventor: Takahiro Nishiyama, Kyoto (JP)

(73) Assignee: Rohm Co., Ltd.

( * ) Notice: Subject to any disclaimer, the term of this patent is extended or adjusted under 35 U.S.C. 154(b) by 129 days.

(21) Appl. No.: 17/916,233

(22) PCT Filed: Mar. 26, 2021

(86) PCT No.: PCT/JP2021/012903
§ 371 (c)(1),
(2) Date: Sep. 30, 2022

(87) PCT Pub. No.: WO2021/200671
PCT Pub. Date: Oct. 7, 2021

(65) Prior Publication Data
US 2023/0155530 A1 May 18, 2023

(30) Foreign Application Priority Data
Apr. 3, 2020 (JP) .................................. 2020-067554

(51) Int. Cl.
*H02P 21/22* (2016.01)
*H02P 21/00* (2016.01)

(52) U.S. Cl.
CPC .......... *H02P 21/22* (2016.02); *H02P 21/0003* (2013.01)

(58) Field of Classification Search
CPC .. H02P 21/22; H02P 21/0014; H02P 21/0003; H02P 29/028
See application file for complete search history.

(56) References Cited

U.S. PATENT DOCUMENTS

| 2017/0217481 A1 | 8/2017 | Asao et al. |
| 2020/0052620 A1* | 2/2020 | Hadinata ................. H02P 6/181 |
| 2021/0165011 A1* | 6/2021 | Thyagarajan .......... G05B 15/02 |

FOREIGN PATENT DOCUMENTS

| JP | H06153560 | 5/1994 |
| JP | 2000092894 | 3/2000 |
| JP | 2020022260 | 2/2020 |
| WO | WO 2016063367 | 4/2016 |
| WO | WO 2019116471 | 6/2019 |

OTHER PUBLICATIONS

International Search Report in International Appln. No. PCT/JP2021/012903, dated Jun. 8, 2021, 5 pages (with English Translation).

* cited by examiner

*Primary Examiner* — Said Bouziane
(74) *Attorney, Agent, or Firm* — Fish & Richardson P.C.

(57) ABSTRACT

A motor control unit (10) includes, for example, a motor control block (11) that performs feedback control of a drive current that flows through a motor (20) and a machine learning block (14) that analyzes input data including at least the drive current so as to detect a failure level of the motor (20). The motor control block (11) could be configured to dynamically switch a control parameter or a control method in accordance with the failure level. The input data may further include, for example, a drive voltage applied to the motor (20). Furthermore, the input data may further include, for example, at least one of vibrations and a temperature of the motor (20) or a motor device (1) mounting the motor (20) therein.

9 Claims, 5 Drawing Sheets

MOTOR CONTROL UNIT AND MOTOR DEVICE

TECHNICAL FIELD

The invention disclosed in the present description relates to a motor control unit and a motor device using the same.

BACKGROUND ART

A motor control unit is mounted in various types of motor devices (such as consumer appliances, industrial equipment, vehicles, or robots that each include a motor).

An example of a conventional technique related to the above can be seen in Patent Document 1.

CITATION LIST

Patent Literature

Patent Document 1: JP-A-2020-022260

SUMMARY OF INVENTION

Technical Problem

Such conventional motor devices, however, have been disadvantageous in that periodic inspection or replacement of a motor (including advance replacement of a non-failed motor that does not necessarily need to be replaced) needs to be performed in order to prevent an operation of the motor control unit from being abnormally stopped due to a failure of the motor, resulting in an increase in maintenance cost (including a cost of inspection or replacement of the motor).

In view of the above-described problem found by the inventor of the present application, an object of the invention disclosed in the present description is to provide a motor control unit capable of reducing a maintenance cost of a motor device and the motor device using the same.

Solution to Problem

For example, a motor control unit disclosed in the present description includes a motor control block configured to perform feedback control of a drive current that flows through a motor and a machine learning block configured to analyze input data including at least the drive current so as to detect a failure level of the motor. The motor control block is configured to dynamically switch a control parameter or a control method in accordance with the failure level.

Advantageous Effects of Invention

According to the invention disclosed in the present description, it is possible to provide a motor control unit capable of reducing a maintenance cost of a motor device and the motor device using the same.

DESCRIPTION OF EMBODIMENTS

Motor Device

Figure 1:
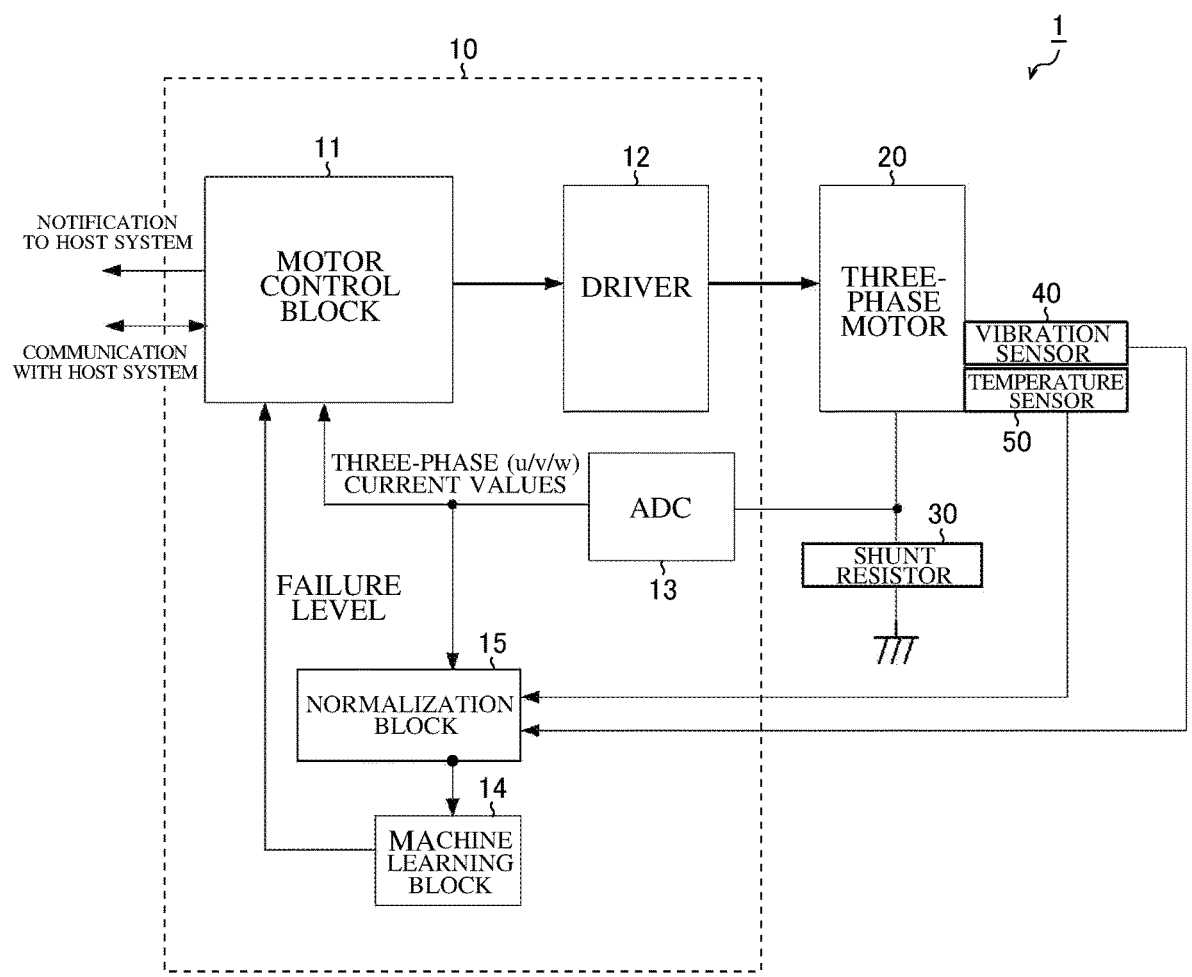
FIG. 1 is a diagram showing a schematic configuration of a motor device.

FIG. 1 is a diagram showing a schematic configuration of a motor device. A motor device 1 of this configuration example includes a motor control unit 10, a three-phase motor 20, a shunt resistor 30, a vibration sensor 40, and a temperature sensor 50.

The motor control unit 10 is a semiconductor integrated circuit unit (a so-called motor control IC) that supplies three-phase drive currents Iu, Iv, and Iw and three-phase drive voltages U, V, and W to the three-phase motor 20 so as to control rotational driving of the three-phase motor 20.

The three-phase motor 20 includes three-phase coils that are connected to the motor control unit 10 and a rotor that rotates in accordance with the drive currents Iu, Iv, and Iw that flow through the three-phase coils (neither of them is shown). A rotation velocity (an angular velocity) of the rotor decreases with decreasing frequencies of the drive currents Iu, Iv, and Iw and increases with increasing frequencies of the drive currents Iu, Iv, and Iw.

The shunt resistor 30 generates a current sense signal according to a current value of each of the drive currents Iu, Iv, and Iw. While this drawing shows, for the sake of convenience of explanation, an example in which the shunt resistor 30 is connected to the three-phase motor 20, the shunt resistor 30 may be connected to an after-mentioned driver 12. Furthermore, as a current detection method, there may be adopted a three-shunt method in which the drive currents Iu, Iv, and Iw are individually detected or a single-shunt method in which the drive currents Iu, Iv, and Iw are detected from a DC bus current of the driver 12.

The vibration sensor 40 is mounted to, for example, the three-phase motor 20 (or any part of the motor device 1) and detects vibrations of the three-phase motor 20 (or the motor device 1). As the vibrative sensor 40, for example, an acceleration sensor or a gyrosensor can be used favorably.

The temperature sensor 50 is mounted to, for example, the three-phase motor 20 (or any part of the motor device 1) and detects a temperature of the three-phase motor 20 (or the motor device 1).

Motor Control Unit

Subsequently, with reference to FIG. 1, a detailed description is given of a configuration and an operation of the motor control unit 10. The motor control unit 10 of this configuration example includes a motor control block 11, the driver 12, an ADC [analog-to-digital converter] 13, a machine learning block 14, and a normalization block 15.

The motor control block 11 accepts an input of a digital current value (=corresponding to a current value of each of the drive currents Iu, Iv, and Iw) from the ADC 13 and drives the driver 12 to perform feedback control of the drive currents Iu, Iv, and Iw that flow through the three-phase motor 20 so that a torque or a rotation velocity of the three-phase motor 20 agrees with a target value.

Furthermore, the motor control block 11 has a function of dynamically switching a control parameter or a control method thereof in accordance with a failure level detected at the machine learning block 14, a function of notifying a host system of the above-described failure level, and a function of communicating with the host system. These functions will be detailed later.

The driver 12 includes three-phase half-bridges (=three-phase upper FETs and lower FETs) connected to the motor control block 11 and generates, based on three-phase gate signals (=upper gate signals applied to respective gates of the three-phase upper FETs and lower gate signals applied to respective gates of the three-phase lower FETs) inputted from the motor control block 11, the three-phase drive currents Iu, Iv, and Iw that flow through the three-phase motor 20. As the driver 12, there may be used a separate IC externally connected to the motor control unit 10.

The ADC 13 converts an analog current sense signal inputted from the shunt resistor 30 into a digital current value (=corresponding to a current value of each of the drive currents Iu, Iv, and Iw) and outputs the digital current value to the motor control block 11 and to the normalization block 15.

The machine learning block 14 analyzes input data inputted from the normalization block 15 so as to detect a value of the failure level (a level indicating a sign of a failure) of the three-phase motor 20. The input data inputted to the machine learning block 14 includes at least information related to the drive currents Iu, Iv, and Iw and, in the example shown in this drawing, further includes information related to vibrations and a temperature of the three-phase motor 20 (or the motor device 1). Furthermore, the input data inputted to the machine learning block 14 may include information related to the drive voltages U, V, and W applied to the three-phase motor 20.

As the failure level, for example, a plurality of stages such as Level 0 (indicating a safe state) to Level 4 (indicating an operation limit) and Level 5 (indicating a failure) could be defined. Furthermore, the failure level is not necessarily proportionate to a degree of severity of an abnormality and may be associated with a cause of the abnormality such as by, for example, defining Level 1 as indicating an abnormality in drive current and Level 2 as indicating an abnormality in drive voltage.

Furthermore, as a learning algorithm of the machine learning block 14, there may be adopted "supervised learning" in which learning is performed using labeled (answered) data or "unsupervised learning" in which learning is performed using unlabeled data. Needless to say, this is not meant to exclude existing other algorithms such as "semi-supervised learning," "reinforcement learning," or "deep learning.

The normalization block 15 normalizes the earlier described input data (such as the drive currents, drive voltages, vibrations, or temperature) before being inputted to the machine learning block 14 so as to reduce dependence on the rotation velocity or a control cycle of the three-phase motor 20. A significance of introducing the normalization block 15 and an operation thereof will be detailed later.

Dynamic Control According to Failure Level

Next, a detailed description is given of the function of dynamically switching a control parameter or a control method of the motor control block 11 in accordance with a value of the failure level detected at the machine learning block 14.

For example, the motor control block 11 could be configured to have a table associating values of the failure level with control parameters so as to select one of the control parameters that is optimum for continuously and efficiently driving the three-phase motor 20 at a current value of the failure level. Furthermore, for example, the motor control block 11 may be configured to switch, in accordance with a value of the failure level, a control method from a vector control method to a 120-degree energization method.

When the failure level turns to Level 5 (indicating a failure), the motor control block 11 may forcibly stop driving of the three-phase motor 20. Furthermore, when only one of the three phases is failed, driving of the three-phase motor 20 may be continued with its energization mode switched from a three-phase energization mode to a two-phase energization mode.

As described above, the motor control block 11 performs dynamic control according to the failure level and thus can continuously and efficiently drive the three-phase motor 20 having started to show a sign of a failure and accurately convey, to a host system, timing (=timing at which the three-phase motor 20 has reached an operation limit) at which there is a true need for replacement thereof. As a result, it is possible to reduce a maintenance cost (=including a cost of inspection or replacement of the three-phase motor 20) of the motor device 1.

The above-described dynamic control may be autonomously executed by the motor control block 11 in accordance with a value of the failure level detected at the machine learning block 14 or may be executed in response to a command from the host system having read the value of the failure level via the motor control block 11.

Notification to Host System

Next, a description is given of the function, in the motor control block 11, of notifying a host system. For example, the motor control block 11 notifies the host system of an alert via a single interrupt line. Timing for notifying the alert could be set to, for example, a time when a variation has occurred in the failure level or a time when the failure level has reached a predetermined level.

Upon receipt of the above-described alert, the host system can read out a value of the failure level stored in an internal register (not shown) of the motor control block 11 via a communication line. Furthermore, even without receiving the alert from the motor control block 11, the host system can read out a value of the failure level at any timing.

It is sufficient that only a latest value of the failure level is stored in the internal register. That is, when a variation has occurred in the failure level, the motor control block 11 is only required to update the value stored in the internal register.

Furthermore, in the internal register, there may also be stored supplemental information grasped at the motor control block 11, such as a cause of a variation in the failure level or a degree of abnormality of each of a plurality of pieces of the input data (the currents, voltages, vibrations, and temperature). In that case, not only information related to the drive currents but also information related to the drive voltages, vibrations, and temperature could be inputted beforehand to the motor control block 11.

Motor Control Block (First Example)

Figure 2:
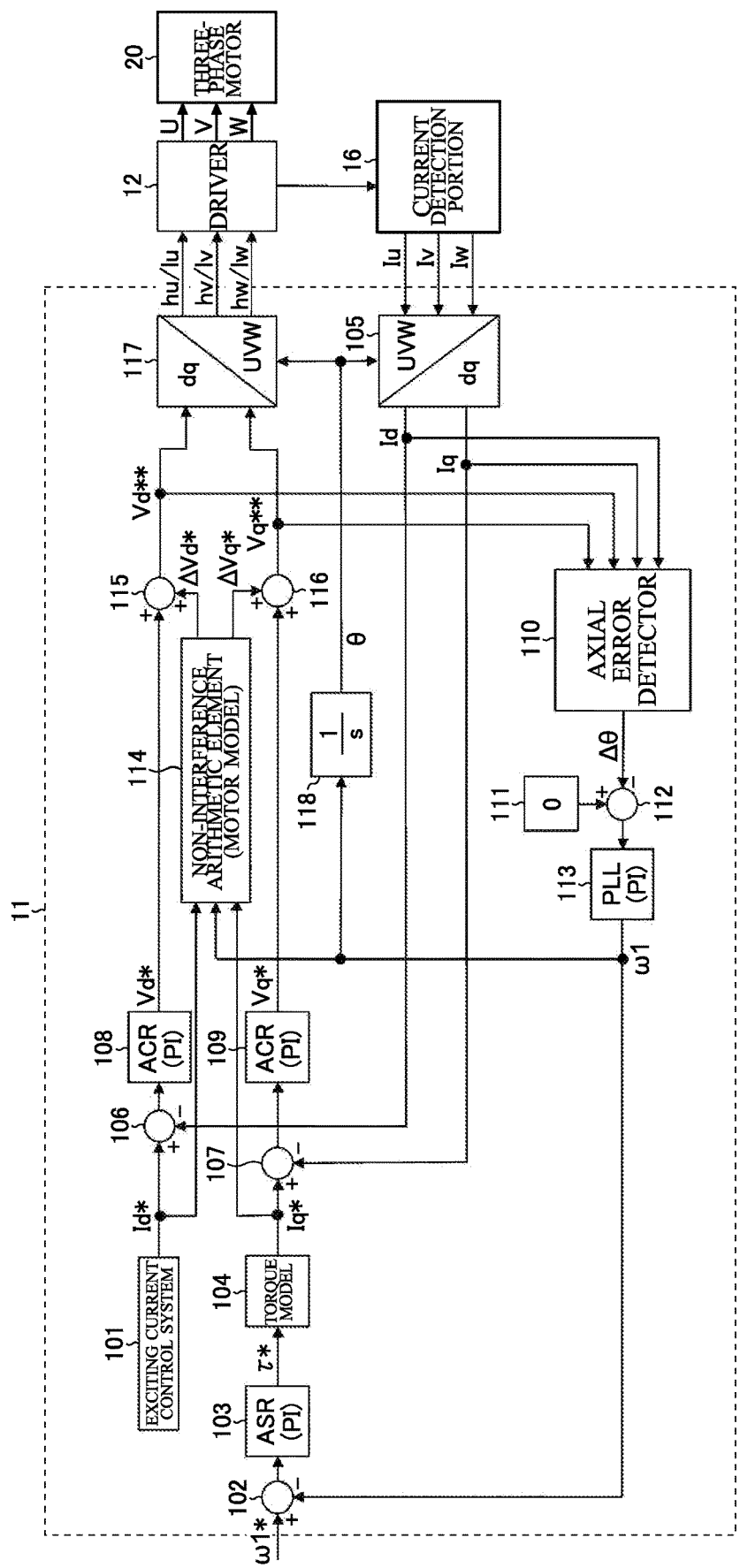
FIG. 2 is a diagram showing a first example of a motor control block.

FIG. 2 is a diagram showing a first example of the motor control block 11. A motor control block 11 of this example includes an exciting current control system 101, an arithmetic element 102, a velocity controller 103, a torque model 104, a three-phase/two-phase conversion portion 105, arithmetic elements 106 and 107, current controllers 108 and 109, an axial error detector 110, an advanced angle control value setting portion 111, an arithmetic element 112, a phase synchronization controller 113, a non-interference arithmetic element (a motor model) 114, arithmetic elements 115 and 116, a two-phase/three-phase conversion portion 117, and a rotor position detection portion 118. The motor control block 11 uses a three-phase sensor-less full vector control method to perform feedback control of the drive currents Iu, Iv, and Iw.

The exciting current control system 101 outputs a d-axis current command Id*.

The arithmetic element 102 outputs a difference value between an angular velocity command $\omega 1^*$ and an angular velocity $\omega 1$.

The velocity controller 103 (a so-called ASR [automatic speed regulator]) performs PI [proportional-integral] control according to an output value (=the difference value between the angular velocity command $\omega 1^*$ and the angular velocity $\omega 1$) of the arithmetic element 102 so as to output a torque command $\tau^*$ for making the angular velocity $\omega 1$ follow the angular velocity command $\omega 1^*$. The velocity controller 103 may have a function of performing any form of error control when a state where the output value of the arithmetic element 102 is more than a predetermined error determination threshold value continues over a plurality of cycles.

The torque model 104 converts the torque command $\tau^*$ into a q-axis current command Iq*.

Using a predetermined conversion algorithm (such as a Clarke transform and a Park transform), the three-phase/two-phase conversion portion 105 converts the three-phase drive currents Iu, Iv, and Iw inputted from a current detection portion 16 into two-phase d-axis current Id and q-axis current Iq. The current detection portion 16 corresponds to, for example, the ADC 13 or the shunt resistor 30 in FIG. 1.

The arithmetic element 106 outputs a difference value between the d-axis current command Id* and the d-axis current Id.

The arithmetic element 107 outputs a difference value between the q-axis current command Iq* and the q-axis current Iq.

The current controller (a so-called ACR [automatic current regulator]) 108 performs PI control according to an output value (=the difference value between the d-axis current command Id* and the d-axis current Id) of the arithmetic element 106 so as to output a d-axis voltage command Vd* for making the d-axis current Id follow the d-axis current command Id*.

The current controller 109 performs PI control according to an output value (=the difference value between the q-axis current command Iq* and the q-axis current Iq) of the arithmetic element 107 so as to output a q-axis voltage command Vq* for making the q-axis current Iq follow the q-axis current command Iq*.

The axial error detector 110 detects an axial error $\Delta\theta$ from the d-axis current Id, the q-axis current Iq, a corrected d-axis voltage command Vd, and a corrected q-axis voltage command Vq. With this configuration including the axial error detector 110 described above, there is no need for an encoder for detecting a rotor position $\theta$, and thus it is possible to achieve cost reduction and improved reliability of the motor device 1.

The advanced angle control value setting portion 111 outputs a predetermined advanced angle control set value (for example, 0).

The arithmetic element 112 outputs a difference value between the predetermined advanced angle control set value and the axial error $\Delta\theta$.

The phase synchronization controller 113 (a so-called PLL [phase-locked loop]) performs PI control according to an output value (=the difference value between the predetermined advanced angle control set value and the axial error $\Delta\theta$) of the arithmetic element 112 so as to output an angular velocity $\omega 1$ (estimated) for causing the axial error $\Delta\theta$ to converge to the advanced angle control set value. This allows a control delay and so on to be absorbed.

The non-interference arithmetic element 114 performs non-interference arithmetic processing based on the d-axis current command Id*, the q-axis current command Iq*, and the angular velocity $\omega 1$ so as to generate a d-axis voltage correction value $\Delta Vd^*$ ($=-\omega 1 \times Lq^* \times Iq^*$) and a q-axis voltage correction value $\Delta Vq^*$ ($=\omega 1 \times Ld^* \times Id^* + kE^* \times \omega 1$). Here, Ld and Lq denote a d-axis coil inductance and a q-axis coil inductance, respectively, and kE denotes a counter electromotive force constant.

The arithmetic element 115 obtains a sum of the d-axis voltage command Vd* and the d-axis voltage correction value $\Delta Vd^*$ and outputs the sum as the corrected d-axis voltage command Vd**.

The arithmetic element 116 obtains a sum of the q-axis voltage command Vq* and the q-axis voltage correction value $\Delta Vq^*$ and outputs the sum as the corrected q-axis voltage command Vq**.

Using a predetermined conversion algorithm (such as an inverse Park transform and an inverse Clarke transform), the two-phase/three-phase conversion portion 117 converts the two-phase d-axis voltage command Vd and q-axis voltage command Vq into three-phase (six in total of upper and lower) gate signals hu/lu, hv/lv, and hw/lw and outputs them to the driver 12.

The rotor position detection portion 118 detects the rotor position $\theta$ by integrating the angular velocity $\omega 1$ and outputs it to each of the three-phase/two-phase conversion portion 105 and the two-phase/three-phase conversion portion 117.

Herein, in accordance with a value of the failure level detected at the machine learning block 14 (not shown), the motor control block 11 dynamically switches at least one of a PI gain and an error determination threshold value of the velocity controller 103, respective PI gains of the current controllers 108 and 109, the d-axis coil inductance Ld, the q-axis coil inductance Lq, and the counter electromotive force constant kE of the non-interference arithmetic element 114, a coil resistance R, a d-axis coil inductance Ld, and a q-axis coil inductance Lq of the axial error detector 110, and a PI gain of the phase synchronization controller 113.

For example, when it is previously assumed that a torque of the three-phase motor 20 decreases with increasing value of the failure level, auto-tuning could be executed in which the PI gain of the velocity controller 103 is automatically varied proportionately with the failure level.

According to the dynamic control described above, it is possible to continuously and efficiently drive the three-phase motor 20 having started to show a sign of a failure.

A method for controlling the motor control block 11 is not limited to the above-described full vector control method and may be any other type of the vector control method or any other method than the vector control method. The following description proposes a second example using a method other than the vector control method.

Motor Control Block (Second Example)

Figure 3:
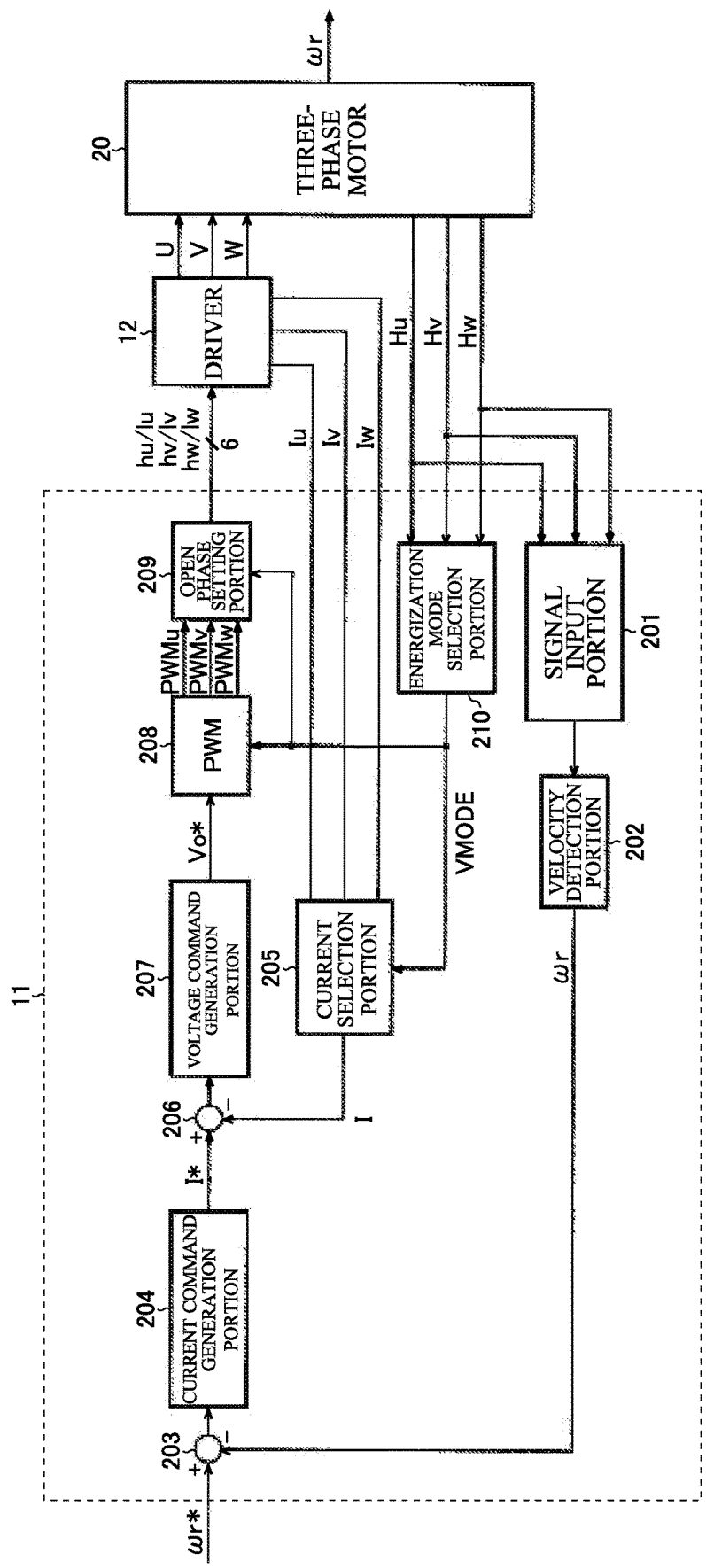
FIG. 3 is a diagram showing a second example of the motor control block.

FIG. 3 is a diagram showing a second example of the motor control block 11. A motor control block 11 of this example includes a signal input portion 201, a velocity detection portion 202, an arithmetic element 203, a current command generation portion 204, a current selection portion 205, an arithmetic element 206, a voltage command generation portion 207, a pulse width modulation portion 208, an open phase setting portion 209, and an energization mode selection portion 210. The motor control block 11 uses a 120-degree energization control method using a three-phase Hall sensor to perform feedback control of the drive currents Iu, Iv, and Iw.

The signal input portion 201 samples three-phase Hall signals Hu, Hv, and Hw inputted from a Hall sensor (not shown) of the three-phase motor 20.

Based on a sampling output of the signal input portion 201, the velocity detection portion 202 detects an angular velocity ωr of the three-phase motor 20.

The arithmetic element 203 outputs a difference value between an angular velocity command ωr* and the angular velocity ωr.

The current command generation portion 204 (corresponding to a velocity controller) performs PI control according to an output value (=the difference value between the angular velocity command ωr* and the angular velocity ωr) of the arithmetic element 203 so as to output a current command I* for making the angular velocity ωr follow the angular velocity command ωr*.

In accordance with an energization mode selection signal VMODE, the current selection portion 205 outputs, as a selected drive current I, any one phase among the drive currents Iu, Iv, and Iw that flow through the driver 12.

The arithmetic element 206 outputs a difference value between the current command I* and the selected drive current I.

The voltage command generation portion 207 (corresponding to a current controller) performs PI control according to an output value (=the difference value between the current command I* and the selected drive current I) of the arithmetic element 206 so as to output a voltage command Vo*.

The pulse width modulation portion 208 performs distribution processing and pulse width modulation processing of the voltage command Vo* in an energization mode (a two-phase energization mode or a three-phase energization mode) according to the energization mode selection signal VMODE so as to generate three-phase pulse width modulation signals PWMu, PWMv, and PWMw.

The open phase setting portion 209 selects an open phase in accordance with the energization mode selection signal VMODE and outputs three-phase (six in total of upper and lower) gate signals hu/lu, hv/lv, and hw/lw to the driver 12.

Based on the Hall signals Hu, Hv, and Hw, the energization mode selection portion 210 generates the energization mode selection signal VMODE.

Herein, in accordance with a value of the failure level detected at the machine learning block 14 (not shown), the motor control block 11 dynamically switches at least one of a PI gain of the current command generation portion 204 (corresponding to the velocity controller) and a PI gain of the voltage command generation portion 207 (corresponding to the current controller). According to the dynamic control described above, it is possible to continuously and efficiently drive the three-phase motor 20 having started to show a sign of a failure.

Normalization Block

The following details the significance of introducing the normalization block 15 and the operation (a normalization technique) thereof. If the normalization block 15 has not been introduced, a variation in the rotation velocity or the control cycle (a control frequency) of the three-phase motor 20 alone causes a variation in behavior of the input data (such as the drive currents, drive voltages, vibrations, and temperature) inputted to the machine learning block 14, leading to a fear of erroneous detection of the failure level.

To avoid the above situation, in the motor control unit 10, there has been introduced the normalization block 15 that normalizes the above-described input data before being inputted to the machine learning block 14 so as to reduce dependence on the rotation velocity or the control cycle of the three-phase motor 20.

According to such a configuration, even when there occurs a variation in the rotation velocity or the control cycle of the three-phase motor 20, it is possible, without changing a weight of the machine learning block 14 in accordance with the variation, to precisely detect the failure level.

Figure 4:
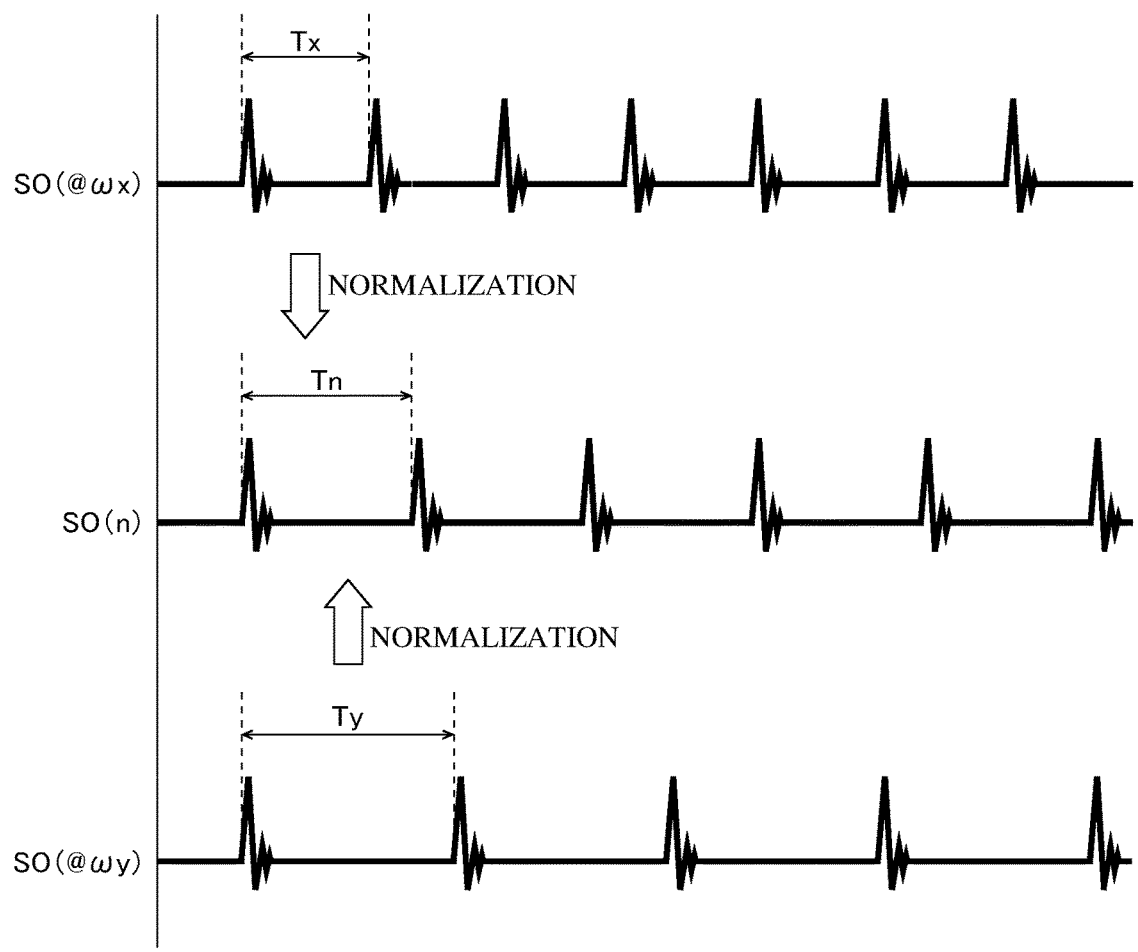
FIG. 4 is a diagram showing a first operation example of a normalization block.

FIG. 4 is a diagram showing a first operation example of the normalization block 15, in which a sensor output signal SO(@ωx) at a rotation velocity ωx (corresponding to, for example, an output signal of a vibration sensor), a normalized sensor output signal SO(n), and a sensor output signal SO(@ωy) at a rotation velocity ωy (<ωx) are depicted in order from above.

As shown in this drawing, pulse cycles Tx and Ty of a sensor output signal SO vary depending on the rotation velocities ωx and ωy of the three-phase motor 20. From this viewpoint, a sampling cycle of the sensor output signal SO is controlled to vary in accordance with the rotation velocities ωx and ωy of the three-phase motor 20 so that the pulse cycles Tx and Ty of the sensor output signal SO are normalized to a predetermined fixed length Tn, and thus it is possible, without depending on the rotation velocities ωx and ωy of the three-phase motor 20, to precisely detect the failure level at the machine learning block 14 having a constant weight.

Figure 5:
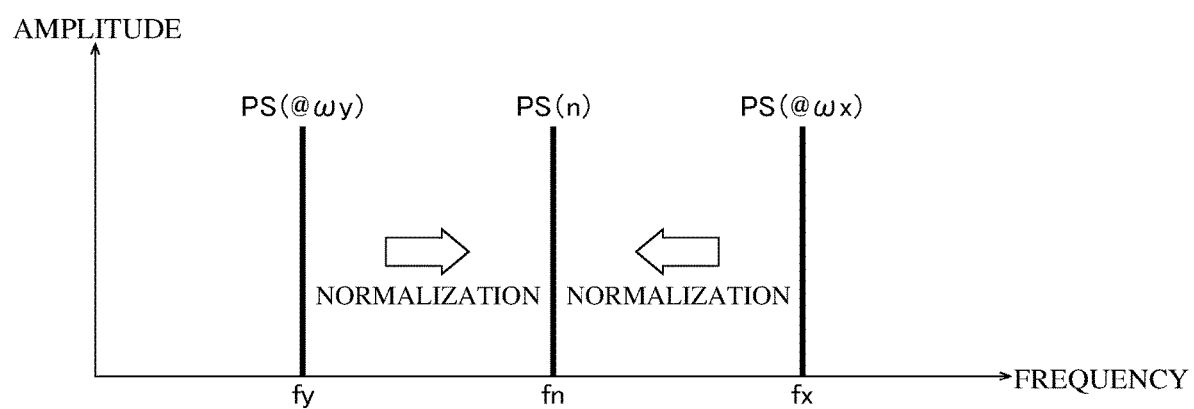
FIG. 5 is a diagram showing a second operation example of the normalization block.

FIG. 5 is a diagram showing a second operation example of the normalization block 15, in which a power spectrum PS is shown that is obtained by subjecting the sensor output signal SO described earlier to frequency conversion processing such as an FFT [fast Fourier transform] or a DCT [discrete cosine transform]. Specifically, a power spectrum PS(@ωx) of the sensor output signal SO at the rotation velocity ωx, a normalized power spectrum PS(n), and a power spectrum PS(@ωy) of the sensor output signal SO at the rotation velocity ωy are depicted in order from a right side.

As shown in this drawing, peak frequencies fx and fy of the power spectrum PS vary depending on the rotation velocities ωx and ωy of the three-phase motor 20. From this viewpoint, in accordance with the rotation velocities ωx and ωy of the three-phase motor 20, the peak frequencies fx and fy of the power spectrum PS are normalized to a predetermined fixed frequency fn, and thus it is possible, without depending on the rotation velocities ωx and ωy of the three-phase motor 20, to precisely detect the failure level at the machine learning block 14 having a constant weight.

Overview

To follow is an overview of the various embodiments that have been described so far.

For example, the motor control unit disclosed in the present description includes a motor control block configured to perform feedback control of a drive current that flows through a motor and a machine learning block configured to analyze input data including at least the drive current so as to detect a failure level of the motor. The motor control block is configured to dynamically switch a control parameter or a control method in accordance with the failure level (a first configuration), The motor control unit of the above-described first configuration may have a configuration (a second configuration) in which the input data further includes a drive voltage applied to the motor.

Furthermore, the motor control unit of the above-described first or second configuration may have a configuration (a third configuration) in which the input data further includes at least one of vibrations and a temperature of the motor or a motor device mounting the motor therein.

Furthermore, the motor control unit of any of the above-described first to third configurations may have a configuration (a fourth configuration) in which the motor control block uses the vector control method to perform the feedback control of the drive current.

Furthermore, the motor control unit of the above-described fourth configuration may have a configuration (a fifth configuration) in which, in accordance with the failure level, the motor control block dynamically switches at least one of a PI gain and an error determination threshold value of a velocity controller, a PI gain of a current controller, a d-axis coil inductance, a q-axis coil inductance, and a counter electromotive force constant of a non-interference arithmetic element, a coil resistance, a d-axis coil inductance, and a q-axis coil inductance of an axial error detector, and a PI gain of a phase synchronization controller.

Furthermore, the motor control unit of any of the above-described first to third configurations may have a configuration (a sixth configuration) in which the motor control block uses the 120-degree energization control method to perform the feedback control of the drive current.

Furthermore, the motor control unit of the above-described sixth configuration may have a configuration (a seventh configuration) in which, in accordance with the failure level, the motor control block dynamically switches at least one of a PI gain of a speed controller and a PI gain of a current controller.

Furthermore, the motor control unit of any of the above-described first to seventh configurations may have a configuration (an eighth configuration) further including a normalization block configured to normalize the input data before being inputted to the machine learning block so as to reduce dependence on a rotation velocity or a control cycle of the motor.

Furthermore, the motor control unit of any of the above-described first to eighth configurations may have a configuration (a ninth configuration) in which the motor control block has a function of notifying a host system of the failure level.

Furthermore, the motor device disclosed in the present description has a configuration (a tenth configuration) including a motor and the motor control unit of any of the above-described first to ninth configurations.

Other Modification Examples

Besides the foregoing embodiments, the various technical features disclosed in the present description may be modified in different ways without departing from the gist of technical creation thereof. That is, the foregoing embodiments are to be construed in all respects as illustrative and not limiting. It is to be understood that the technical scope of the present invention is not limited to the foregoing embodiments, and all changes that come within the meaning and range of equivalency of the claims are intended to be embraced therein.

INDUSTRIAL APPLICABILITY

The motor control unit disclosed in the present description is usable as a control unit for various types of motor devices.

REFERENCE SIGNS LIST 1 motor device
10 motor control unit
11 motor control block
12 driver
13 ADC
14 machine learning block
15 normalization block
16 current detection portion
20 three-phase motor
30 shunt resistor
40 vibration sensor
50 temperature sensor
101 exciting current control system
102 arithmetic element
103 velocity controller
104 torque model
105 three-phase/two-phase conversion portion
106, 107 arithmetic element
108, 109 current controller
110 axial error detector
111 advanced angle control value setting portion
112 arithmetic element
113 phase synchronization controller
114 non-interference arithmetic element (motor model)
115, 116 arithmetic element
117 two-phase/three-phase conversion portion
118 rotor position detection portion
201 signal input portion
202 velocity detection portion
203 arithmetic element
204 current command generation portion
205 current selection portion
206 arithmetic element
207 voltage command generation portion
208 pulse width modulation portion
209 open phase setting portion
210 energization mode selection portion

The invention claimed is:
1. A motor control unit, comprising:
a motor control block configured to perform feedback control of a drive current that flows through a motor;
a machine learning block configured to analyze input data including at least the drive current and vibrations of the motor or of a motor device mounting the motor therein so as to detect a failure level of the motor; and
a normalization block configured to normalize the input data before the input data is provided to the machine learning block so as to reduce dependence on a rotation velocity or a control cycle of the motor,
wherein
the normalization block is configured
to normalize pulse cycles of a sensor output signal obtained at a vibration sensor to a predetermined fixed length, or
to normalize peak frequencies of a power spectrum obtained by subjecting frequency conversion pro- cessing on the sensor output signal to a predetermined fixed frequency, and
the motor control block dynamically switches a control parameter or a control method in accordance with the failure level.

2. The motor control unit according to claim 1, wherein the input data further includes a drive voltage applied to the motor.

3. The motor control unit according to claim 1, wherein the input data further includes a temperature of the motor or of the motor device.

4. The motor control unit according to claim 1, wherein the motor control block uses a vector control method to perform the feedback control of the drive current.

5. The motor control unit according to claim 4, wherein in accordance with the failure level, the motor control block dynamically switches at least one of a PI gain and an error determination threshold value of a velocity controller, a PI gain of a current controller, a d-axis coil inductance, a q-axis coil inductance, and a counter electromotive force constant of a non-interference arithmetic element, a coil resistance, a d-axis coil inductance, and a q-axis coil inductance of an axial error detector, and a PI gain of a phase synchronization controller.

6. The motor control unit according to claim 1, wherein the motor control block uses a 120-degree energization control method to perform the feedback control of the drive current.

7. The motor control unit according to claim 6, wherein in accordance with the failure level, the motor control block dynamically switches at least one of a PI gain of a speed controller and a PI gain of a current controller.

8. The motor control unit according to claim 1, wherein the motor control block has a function of notifying a host system of the failure level.

9. A motor device, comprising:
a motor; and
the motor control unit according to claim 1.

* * * * *